United States Patent [19]

Bernus

[11] Patent Number: 5,625,240
[45] Date of Patent: Apr. 29, 1997

[54] MAGNETIC BEARING AND MECHANICAL THRUST BEARING DEVICE FOR POSITIONING A BODY ROTATING RELATIVE TO A STATOR BODY

[75] Inventor: Christophe Bernus, Paris, France

[73] Assignee: Aerospatiale Societe Nationale Industrielle, France

[21] Appl. No.: 244,180

[22] PCT Filed: Sep. 22, 1993

[86] PCT No.: PCT/FR93/00921

§ 371 Date: May 19, 1994

§ 102(e) Date: May 19, 1994

[87] PCT Pub. No.: WO94/07044

PCT Pub. Date: Mar. 31, 1994

[30] Foreign Application Priority Data

Sep. 22, 1992 [FR] France .................... 92 11261

[51] Int. Cl.$^6$ .................................................. H02K 7/09
[52] U.S. Cl. ............................. 310/90.5; 310/90; 310/92; 310/93; 188/67; 188/30; 188/342; 188/82.3
[58] Field of Search ............................. 310/90.5, 90, 92, 310/93; 188/67, 30, 342, 82.3, 82.1

[56] References Cited

U.S. PATENT DOCUMENTS

| 2,604,273 | 7/1946 | Hayes ................... 188/82.2 |
| 4,184,572 | 1/1980 | Poubeau .................. 188/74 |
| 4,231,452 | 11/1980 | Kraft ..................... 188/171 |
| 4,398,773 | 8/1983 | Boden et al. ............. 308/10 |
| 4,470,644 | 9/1984 | Weisser .................. 308/10 |
| 4,918,345 | 4/1990 | Vallant de Guelis et al. ... 310/90.5 |
| 5,054,594 | 10/1991 | Kämpf et al. ............. 192/35 |
| 5,275,261 | 1/1994 | Vranish .................. 188/82.2 |

FOREIGN PATENT DOCUMENTS

| 0145837 | 6/1985 | European Pat. Off. . |
| 1763473 | 12/1957 | Germany . |
| 3322495 | 1/1985 | Germany . |

Primary Examiner—Thomas M. Dougherty
Assistant Examiner—Elvin G. Enad
Attorney, Agent, or Firm—Remy J. VanOphem; Thomas A. Meehan; John VanOphem

[57] ABSTRACT

Device for positioning a rotating body movable about an axis in relation to a stator body including a magnetic bearing and a locking/releasing device. The locking/releasing device embodies a plurality of clamps with pads adapted to radially grip a shaft of the rotating body. The clamps are articulated on the stator body about axial pins spaced from the rotational axis and evenly distributed in an angular manner about the rotational axis, and can be pivotally moved about the axis, by a moving control part between a released configuration in which the gripping pads are at a maximum distance from the axis and a locked configuration in which the pads are at a minimum distance from the axis suitable for inducing radial clamping of the shaft.

25 Claims, 9 Drawing Sheets

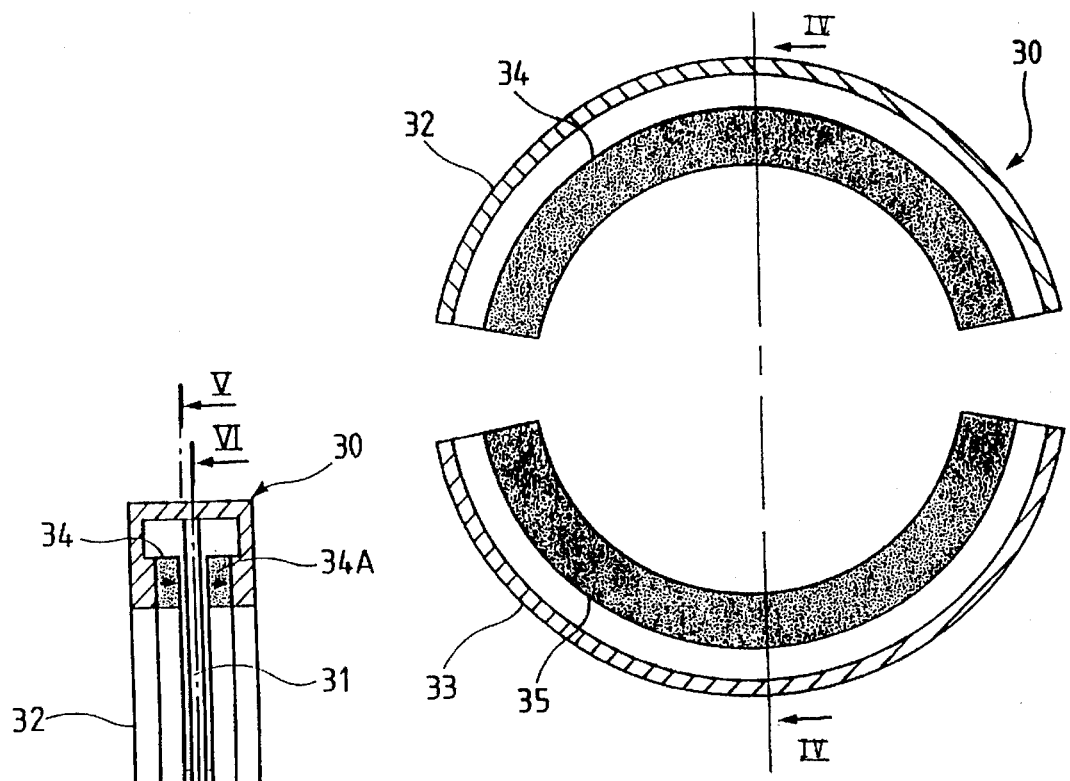
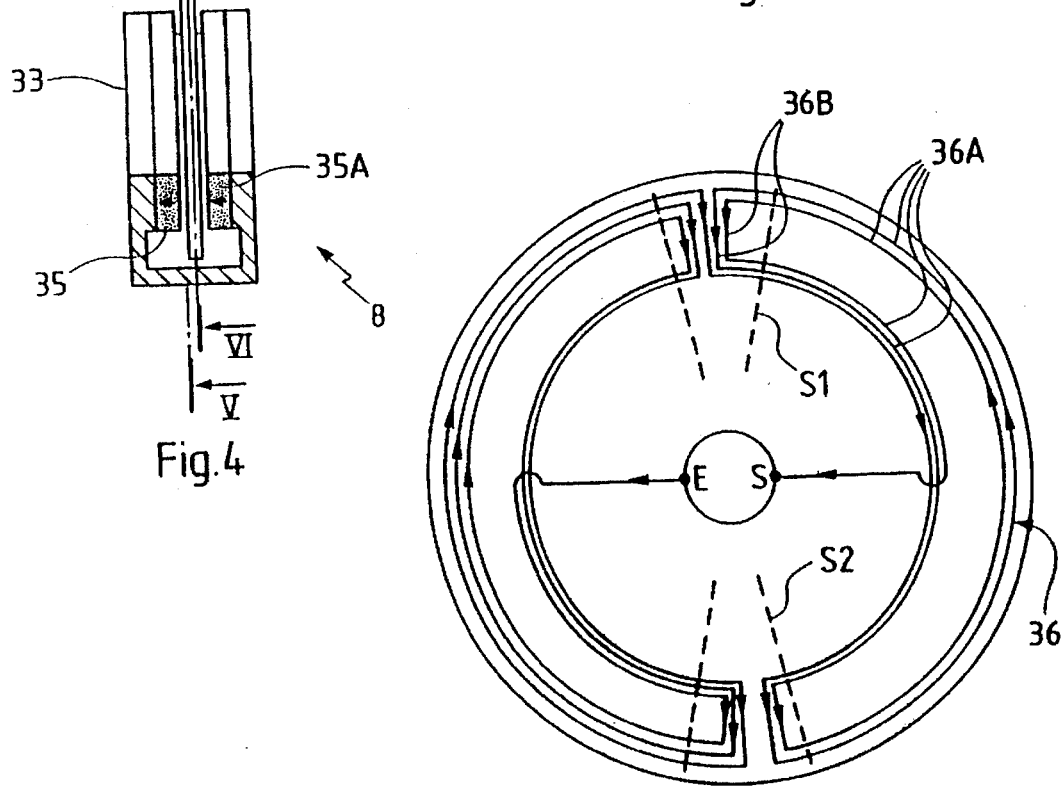
Fig.5
Fig.4
Fig.6

MAGNETIC BEARING AND MECHANICAL THRUST BEARING DEVICE FOR POSITIONING A BODY ROTATING RELATIVE TO A STATOR BODY

BACKGROUND OF THE INVENTION

The invention concerns the use of a magnetic bearing to position a body rotating relative to a stator body and is more particularly concerned with the mechanical retention that is required in practice before the magnetic bearing is activated and/or to protect the magnetic bearing from vibration or excessive amplitude likely to damage it. The invention has preferable, but not exclusive, applications in a space environment (intense vacuum, hostile environment, especially thermally, low or even negligible gravity).

It is not possible to design a magnetic bearing which can be passive (using only permanent magnets) both axially and in at least two transverse directions. This is well known. It is always necessary to provide, on one axis at least, active control using an electromagnetic actuator, in practice embodying a coil which is energized to generate in air gaps correcting fluxes which induce a correcting force conditioned by measurement signals supplied by position or speed sensors and set point values for position along the active control axis.

In the absence of any applied current, the rotating body departs from its unstable equilibrium position parallel to the axis on which control is to be applied. For this reason it is beneficial, in particular to avoid any excessive excursion, to provide mechanical abutments against which the rotating body bears in the absence of current in the control loop. To this end it is beneficial to include in the control logic some logic specifically dedicated to the phase in which the rotating body is lifted off the abutments when the control loop is activated.

There are two major categories of magnetic bearings, namely active axial control and passive radial control bearings and passive axial control and active radial control bearings. In the former case, where the rotating body is in unstable equilibrium parallel to the rotation axis, it is known to provide axial thrust bearings which can be mobile so that it is possible to key the rotating body axially. In the latter case, in which the rotating body is in unstable equilibrium transverse to the rotation axis, either the rotating body is allowed to depart from its usual set point radial position to bear radially against the abutments or, as previously, the rotating body is retained by axial keying.

The types of mechanical retention referred to above cannot always be used, either for reason of limited axial overall dimensions or because of their inability to retain the rotating body firmly in the presence of high levels of vibration, of the type generated in a satellite during launch, for example, or during firing or orbit correction thrusters.

SUMMARY OF THE INVENTION

An object of the invention is to overcome the above disadvantages and thus to ensure firm retention of the rotating body in the case of active radial control (or even in the case of axial control through choice of appropriate coefficients of friction), preferably in the equilibrium set point position of the rotating body, in a simple and reliable way, preferably in such a way as to avoid the use of complex lift logic, and enabling reversible operation of the retaining members to enable testing thereof on the group prior to launch.

To this end the invention proposes a device for positioning a body rotating about an axis relative to a stator body including a magnetic bearing and a locking/unlocking device. The locking/unlocking device includes a plurality of clamps having clamping shoes adapted to bear radially on a shaft of the rotating body. The clamps are articulated to the stator body about axial pins at a distance from the rotation axis and equi-angularly distributed around the rotation axis and pivot around the axial pins due to the action of a mobile maneuvering member between an unlocked configuration in which the clamping shoes are at a maximum distance from the axis and a locked configuration in which the shoes are at a minimal distance from the axis so that the shaft is clamped radially.

According to preferred features of the invention, some of which may be combinable with others: the maneuvering member is an annular ring concentric with the axis having a given angular displacement including as many axial pins as there are clamps. Each clamp includes a circumferential slot through which one of the pins passes, the radially internal and external edges of the slot forming ramps for the pins. The slot has a first circumferential end at a minimal distance from the rotation axis and a second circumferential end at a maximal distance from the rotation axis whereby, when the pins on the ring are at the first circumferential extremities of the slots the clamps are in their unlocked configuration and when the pins on the ring are at the second circumferential ends of the slots the clamps are in their locked configuration.

The axial pins each have bearings adapted to roll on the radially internal or external edges of the circumferential slots.

The clamp shoes are urged radially towards the axis by spring members operating on the ring.

The maneuvering ring is linked to a stator portion by a plurality of globally radial spring members operating in compression and mobile in a plane transverse to the axis to either side of an unstable configuration in which they are radially oriented between two stable extreme positions in which the clamps are respectively in their locked and unlocked configurations.

The ring is displaced angularly by a torque motor having an armature fastened to the ring and a field assembly joined to the stator body.

The armature is globally in the shape of a flat disk and the field assembly is formed by at least one pair of circumferentially separated magnetic armatures capping without contacting the radially external periphery of the disk and having on separated angular sectors two flanges forming axial projections facing each other through the disk. At least one portion of a permanently magnetized ring coplanar with the axis is formed in each armature to generate a magnetic flux closed axially between the flanges through the armature. The armature includes at least one plane coil with an input and an output formed by concentric circular arc strands concentric with the axis and radial strands connecting the circular arc strands to form at least one set of banana-shape turns nested in each other but connected in series. The radial strands of each coil are grouped into at least one pair of groups formed of adjacent strands but separated so that when current is applied between the input and the output of the coil all the radial strands of the same group carry current in the same radial direction, each group being disposed axially between the flanges of a respective armature. The axial direction of the flux through the armature between the flanges of each armature is chosen so that when current is supplied between the input and the output of the coil the interaction between the currents flowing in the strands of the groups and the axial magnetic fluxes generate on the armature torques in the same direction, the angular amplitude of angular displacement being defined by the difference between the angle subtended by the pairs of flanges and the angle subtended by the groups of radial strands.

The permanently magnetized ring portion of each armature constitutes one flange of the armature and is permanently magnetized in the axial direction.

Each flange of each armature is constituted by a ring portion permanently magnetized in the axial direction.

The motor includes a single pair of diametrically opposed armatures and a single pair of diametrically opposed groups per coil.

The angle subtended by each armature is between 90° and 170°.

The angle subtended by each group is less than approximately 30°.

The armature is formed of a plurality of coils connected in series formed in axially stacked layers electrically insulated from each other, the input of each coil being connected to the output of the preceding coil, and the groups of coils, the strands of which carry currents in the same radial direction at any given time, are axially stacked.

The armature is formed of two to ten layers of coils. The coils are printed circuit tracks.

The rotating body is rotated within an angular displacement of less than 180° by an angular displacement drive motor including an armature having globally the shape of a flat disk rotating relative to a field assembly formed of at least one pair of circumferentially separated magnetic armatures capping without contacting the radially external periphery of the disk and having on separated angular sectors two flanges forming axial projections facing each other through the disk. At least one portion of a permanently magnetized ring coplanar with the axis is formed in each armature to generate a magnetic flux closing axially between the flanges through the armature. The armature includes at least one plane coil with an input and an output formed of two concentric circular arc strands concentric with the axis and radial strands connecting the circular arc strands to form at least one pair of assemblies connected in series of banana-shape turns nested in each other but connected in series, the radial strands of each coil being grouped into at least one pair of groups of adjacent but separated strands so that when current is applied between the input and the output of the coil all the radial strands in the same group carry current in the same radial direction, each group being disposed axially between the flanges of a respective armature. The axial direction of the flow through the armature between the flanges of each armature is chosen so that when current is applied between the input and the output of the coil interaction between the currents flowing in the strands of the groups and the axial magnetic fluxes generates on the armature torques in the same direction, the amplitude of the angular displacement being defined by the difference between the angle subtended by the pairs of flanges and the angle subtended by the groups of radial strands.

The motor rotating the rotating body and the motor rotating the ring have common armatures with, between the armatures of the two motors and between the flanges of the common armatures, fixed magnetic partially annular parts magnetically isolated from the stator part.

The rotating body is rotated within an angular displacement of less than 180° about an X—X axis by an angular displacement drive motor including a field assembly connected to the shaft and a fixed armature such that the field assembly includes a central bar elongate along the axis and a ferromagnetic tubular portion extending circumferentially all around this central bar at a radial distance therefrom. The central bar includes two diametrically opposed portions of the same cylinder concentric with the given axis, subtending substantially the same angles less than 180° and separated by two longitudinal flats that are globally parallel and a permanently magnetized central bar on the given axis whose magnetization direction is substantially parallel to the flats.

The armature is a tubular member interposed radially between the central bar and the ferromagnetic tubular portion and includes at least one coil having an input and an output and including separate parallel longitudinal strands connected by strands disposed transversely to the given axis. The longitudinal strands are divided into two diametrically opposed groups, all the strands of a group carrying current in the same direction when current is applied between the input and the output of the coil. Each group faces a respective cylinder portion and the given angular displacement is less than the difference between the angles subtended by the cylinder portions and by the groups.

The clamp shoes are applied to the ferromagnetic tubular portion of the field assembly.

The locking device is disposed axially between two magnetic bearings with two transverse control axes.

Each magnetic bearing includes a ferromagnetic pole ring carried by the shaft and, around this ring, carried by the stator, a ring permanently magnetized in the axial direction, two pairs of axial cores carrying coils, and two pole plates gripping the permanently magnetized ring and the pairs of cores.

The magnetic bearing has two transverse control axes and includes an annular ring permanently magnetized in the axial direction gripped between two annular pole pieces and linked to the shaft and, on either radial side of the ring, two pairs of coils around axial cores gripped between pole plates and a ring to close the magnetic flux.

The device includes a tilt control device including a plurality of coils adapted to apply to the shaft a torque transverse to the rotation axis.

The coils of the plurality of coils are disposed around cores disposed at least approximately axially facing a rotor part linked to the shaft, on either side of this portion and the shaft rotation axis. The device includes a tilt control device including one pair of coils of the bearing and control unit adapted to offset the radial set point position of the shaft transversely to the rotation axis.

Finally, the shaft includes axial abutments adapted to face axially clamping shoes in the locked configuration whereby the shaft is held axially in the locked configuration.

By virtue of one aspect of the invention that is novel in itself, the radial air gaps of the magnetic bearing in which the shaft is mounted are exploited to enable tilting of the shaft which is minimal but in practice sufficient, for example, to compensate the advance in its orbit of a satellite carrying an angular displacement control device supporting a scanning mirror with its axis parallel to the orbit. Such tilting is advantageously commanded by modification of the set point for the position of the shaft in its magnetic bearing(s). To this end, the bearing is advantageously chosen to have at least one active radial axis (transverse to the tilt axis) or opposite direction axial actions applied at diametrically opposed areas of the rotor part of the bearing.

Objects, features and advantages of the invention emerge from the following description given by way of non-limiting example with reference to the appended drawings.

BRIEF DESCRIPTION OF THE DRAWINGS

FIG. 4 is a view of the motor from FIG. 1 in axial section on the line IV—IV in FIG. 5;

FIG. 5 is a front view of the stator part of the motor on the line V—V in FIG. 4;

FIG. 6 is a view of the mobile disk of the motor in section on the line VI—VI in FIG. 4;

DETAILED DESCRIPTION OF THE PREFERRED EMBODIMENT

Figure 1:
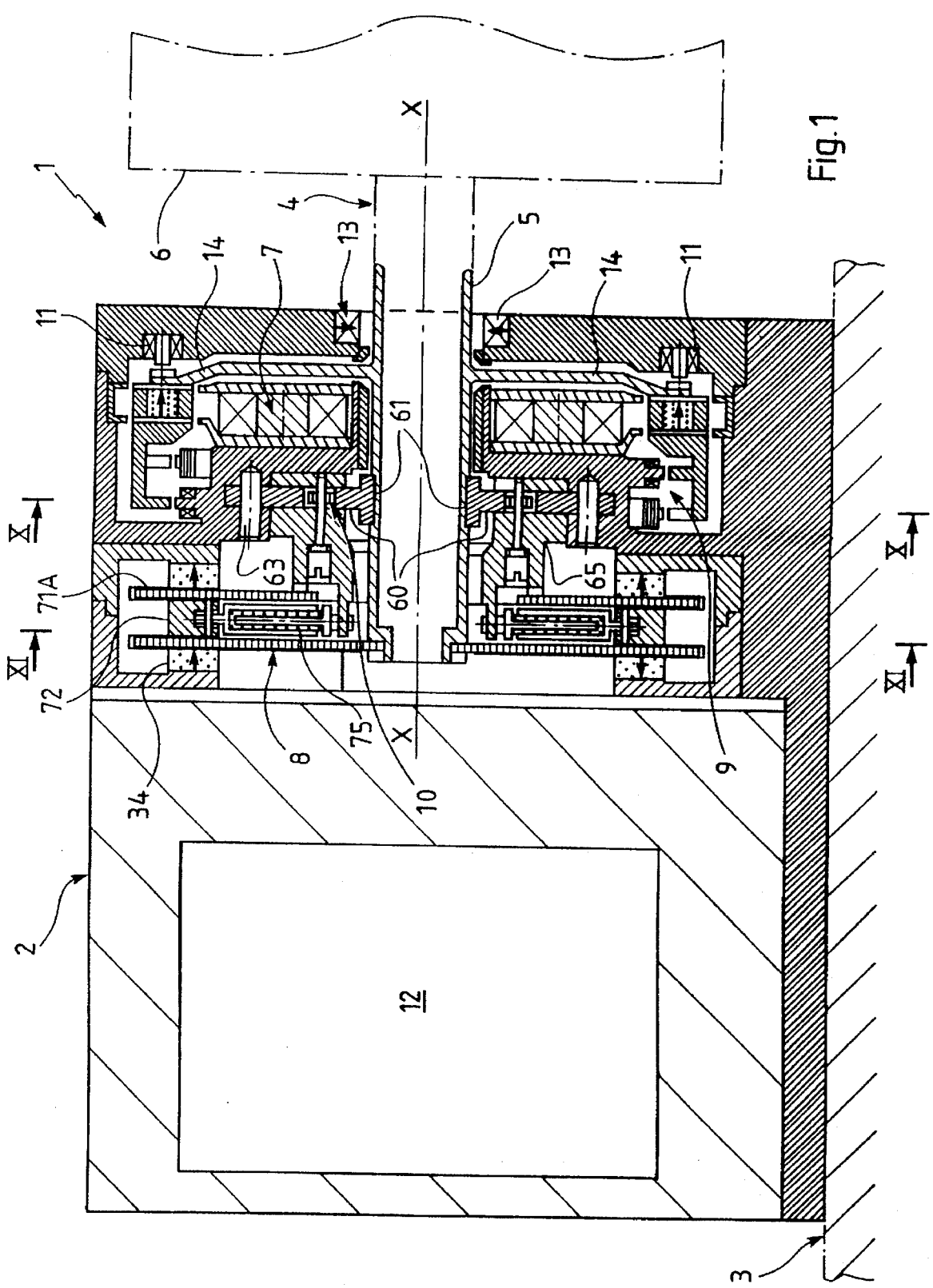
FIG. 1 is a diagrammatic axial section of an angular displacement control device.

FIG. 1 shows an angular displacement control device 1 including a stator part 2 intended to be fixed to a support 3, for example a satellite in terrestrial orbit, and a rotor part 4 rotatable relative to the stator part 2 about an axis X—X, for example an axis parallel to the aforementioned orbit, including a shaft 5 and a payload 6 such as a scanning mirror.

The device 1 essentially embodies a bearing 7, a motor 8, an optional angular resolver 9, a locking device 10 (advantageously disposed axially between the motor and the bearing, which improves the retention of the shaft), a tilt control device 11 and an electronic unit 12 controlling the operation of the various components of the control device 1. Radial position sensors 13 are provided for the bearing 7.

The bearing 7 is an active magnetic bearing which eliminates all friction and all the drawbacks usually associated with friction such as vibration, hysteresis phenomenon on reversing the direction of motion, etc., which would be prejudicial to good angular accuracy. In this example there is only one bearing, which helps to facilitate tilting (the center of mass of the rotor part is then preferably substantially in the plane of the bearing).

By virtue of an aspect of the invention that is novel in itself, the tilt control device 11 exploits the existing axial or radial angular displacement between the rotor and the stator of a bearing to obtain tilting either by radial displacement of the rotor part of the bearing or by axial action in opposite directions at two diametrically opposed areas of the rotor part.

The motor 8 has a limited angular displacement which in this example can approach (but not reach) a value of 180°; it is very flat, so that its overall axial dimension is much smaller than prior art motors (so that it is easy to fit to a drive shaft, even if the latter is very short); this is combined with very low rotational inertia about the X—X axis.

In this example it is controlled by the angular resolver 9 which senses the angular position of the rotor part 4 relative to the stator part and is of any appropriate known type, preferably the magnetic rather than the optical type, in this example, because of the simpler design and slightly greater tolerances.

The locking device 10 is novel in itself in that it is a reversible mechanical system of the self-centering clamp type, avoiding the drawbacks of pyrotechnic solutions, including pollution, on-off action, insufficient control of manufacturing reproducibility, insufficient safety in the presence of human operatives, and enables complete ground tests with a plurality of locking and unlocking cycles.

The various stages mentioned above are described in more detail below.

Various numerical values are given, in relation to the example under consideration here, corresponding to the following specifications for a satellite optical scanning system:

| | |
|---|---|
| aiming accuracy: | $0.25*10^{-3}$ mech rad |
| stability over 150 ms: | $0.085*10^{-3}$ mech rad |
| maximum angular displacement: | 113.925° |
| reaction disturbing torque: | $6*10^{-2}$ N.m |
| transition time between two aiming positions offset by 1.65° mechanical: | 66 ms |
| mechanical mass: | <4 kg |
| tilt amplitude: | $1.38*10^{-3}$ rad |
| supply voltage: | 22–37 V |
| service life: | 4 years (storage) + 5 years (service) |

Figure 2:
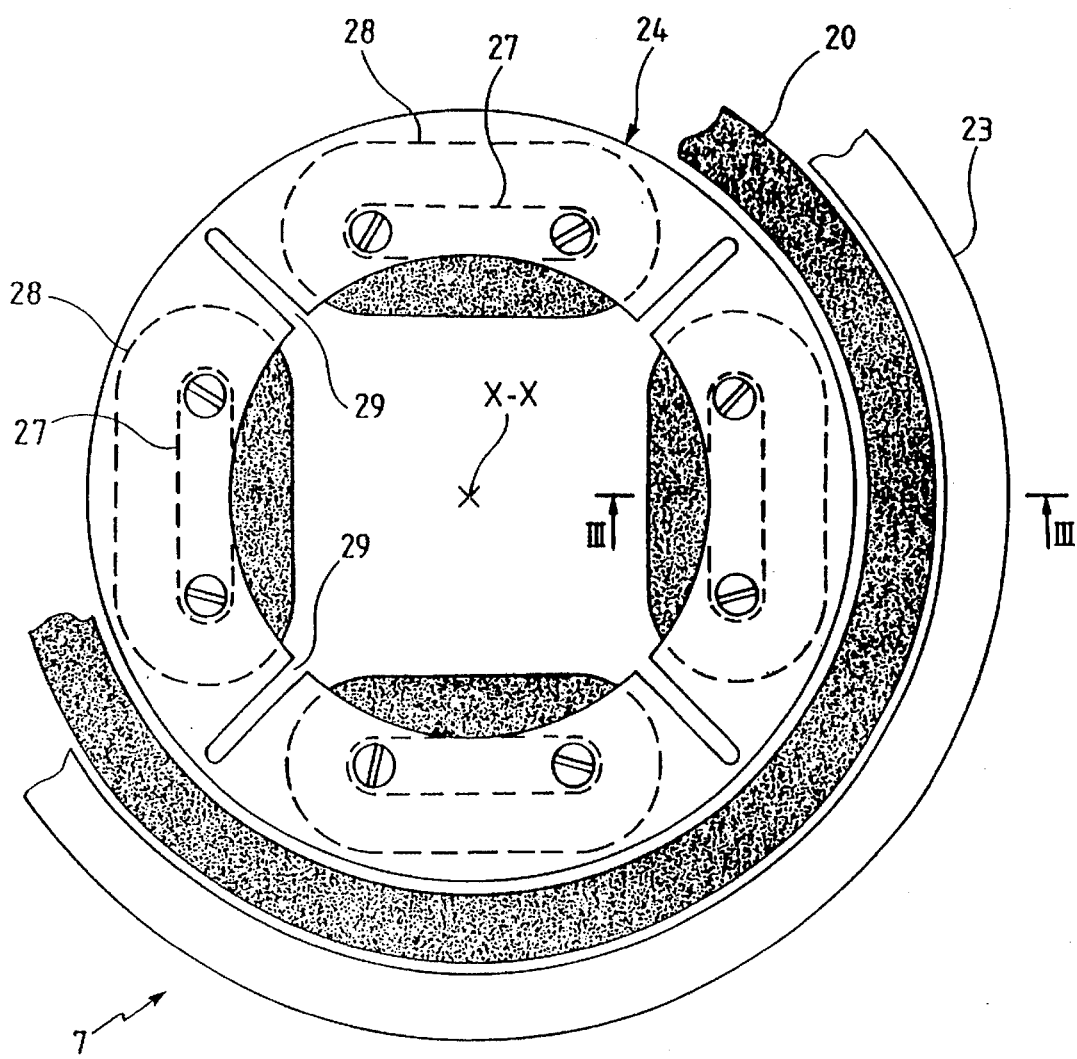
FIG. 2 is a partly cut away axial section of the magnetic bearing from FIG. 1.
Figure 3:
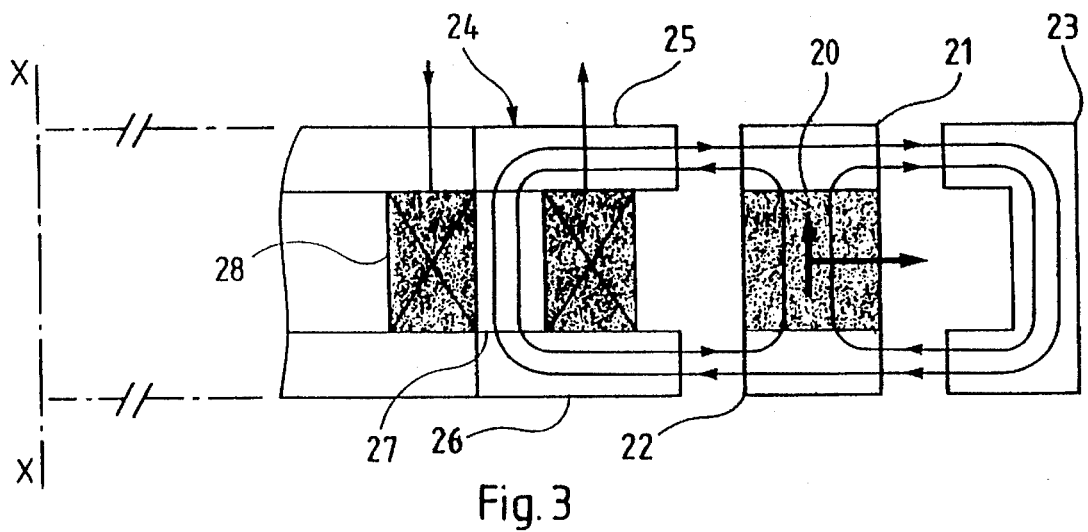
FIG. 3 is a view of the bearing in axial section on the line III—III in FIG. 2.

FIGS. 2 and 3 show the structure and operation of the magnetic bearing 7.

The magnetic bearing 7 is of a conventional type known from U.S. Pat. No. 4,470,644 (WEISSER) already used in various space applications (including inertia wheels for the SPOT and HELIOS satellites) and terrestrial applications (industrial bearings for electric turbines, for example).

The bearing 7 in this example is of the type with two transverse control axes (the expression "active radial control and passive axial control" is sometimes used to describe this type of bearing). This solution is beneficial for reasons including the compact overall size in the axial direction. If this constraint does not apply, a bearing with passive radial control and active axial control may be preferable, having advantages of simplicity from the electronics point of view.

A magnetic suspension system can never be completely passive since it can be shown that there is always at least one degree of freedom in which the suspended part (the rotor) is in a state of unstable equilibrium (i.e. the suspension has a negative stiffness for this degree of freedom), requiring the use for this degree of freedom of an active loop with coil type actuators.

As is made clear below, the fact that the bearing 7 has active radial control has the advantage that by modifying the control set points it is possible to control the tilting of the X—X axis of the shaft.

Referring to FIGS. 2 and 3, the bearing includes, on the rotor part side, a ring 20 of axially magnetized permanent magnets axially sandwiched between two flat annular pole pieces 21 and 22 and, on the stator part side, an exterior ring 23 for closing the magnetic circuit with a U-shaped axial cross section and an interior ring 24 including two flat annular pole pieces 25 and 26 gripping four cores 27 each carrying a coil 28 and offset 90°. Slots 29 are advantageously provided in the pole pieces 25 and 26 to divide them into 90° sectors which are connected only near the ring of magnets 20; these slots prevent magnetic leakage from one coil to the other. Two diametrically opposed coils are associated with each radial control axis (of which there are two in this example). They are electrically connected together to form a circuit independent of that for the other axis.

This ring of magnets is attached to the central shaft by a plurality of arms 14.

In this type of bearing the rotor is returned by passive means if it is displaced axially or if it tilts about an axis perpendicular to the X—X axis.

The flux from the coils and the magnets intermingle (see FIG. 3). The permanent magnets of the ring 20 produce a static main flux and the coils, when energized by a current in a given direction, generate an additional flux which modulates the permanent or static flux in the air gaps and therefore increases on one side of the ring (the outside in FIG. 3) and reduces on the other side of the ring (the inside in FIG. 3) the radial force applied to the suspended part so as to apply to the latter a radial force whose direction and amplitude tend to return the suspended part to its equilibrium position. It is sufficient to reverse the current in the coils to generate a force in the opposite direction. The coils associated with the same axis are naturally mounted and energized so that they always apply forces in the same direction. An advantage of this arrangement is that it produces a quasi-linear force/current characteristic: this enables the use of simple linear amplifiers in the electronic unit.

In addition to the absence of friction (increasing the service life) and of "friction noise" (improving angular accuracy), permanent magnet bearings have the following advantages:

very compact overall size;

virtually null continuous consumption in the absence of vibrational disturbance; and radial, axial and tilt stiffnesses more than sufficient for the intended application.

One example of the dimensions of the bearing 7 is as follows:

| | |
|---|---|
| means diameter of bearing rotor: | 100 mm |
| air gaps (exterior and interior): | 0.50 mm |
| rotation inertia of rotor and parts fixing it to the shaft: | 5.8*10$^{-4}$ kg.m$^2$ |
| mass of magnets: | 50 g |
| stiffness: | |
| axial: | 62 N/mm |
| radial: | 225 N/mm |
| tilt: | 140 N.m/rd |
| abutment radial clearance (at radius): | 0.20 mm |
| actuator coil: | |
| . number of turns: | 300 |
| . wire diameter: | 0.25 mm |
| . lift current under 1 g for 0.2 mm of initial offset | 1.1 A |
| . minimum lift voltage | 16 V |

Note that during ground tests, if the assembly is disposed with the axis vertical the radial control loop does not require more electrical power than in flight: the weight of the suspended assembly does not affect the radial position of the rotor. The lift voltage and current indicated above are rated to enable the bearing to operate on the ground regardless of its position; however, only the vertical position with the weight compensated by an axial device (counterweight and pulley) is representative of operation in zero gravity.

As an alternative (not shown), the bearing can be of the type with two control axes, the magnets and the coils of which are carried by the stator (so that the rotor has a low inertia) as described in U.S. Pat. No. 4,918,345 (VAILLANT DE GUELIS et al).

Control is based on information supplied by the radial position sensors 13 of the rotor (two sensors per control axis). The magnetic bearing 7 can use speed sensors or displacement sensors, and it will be apparent to one skilled in the art to adapt the electronic unit accordingly.

Figure 12:
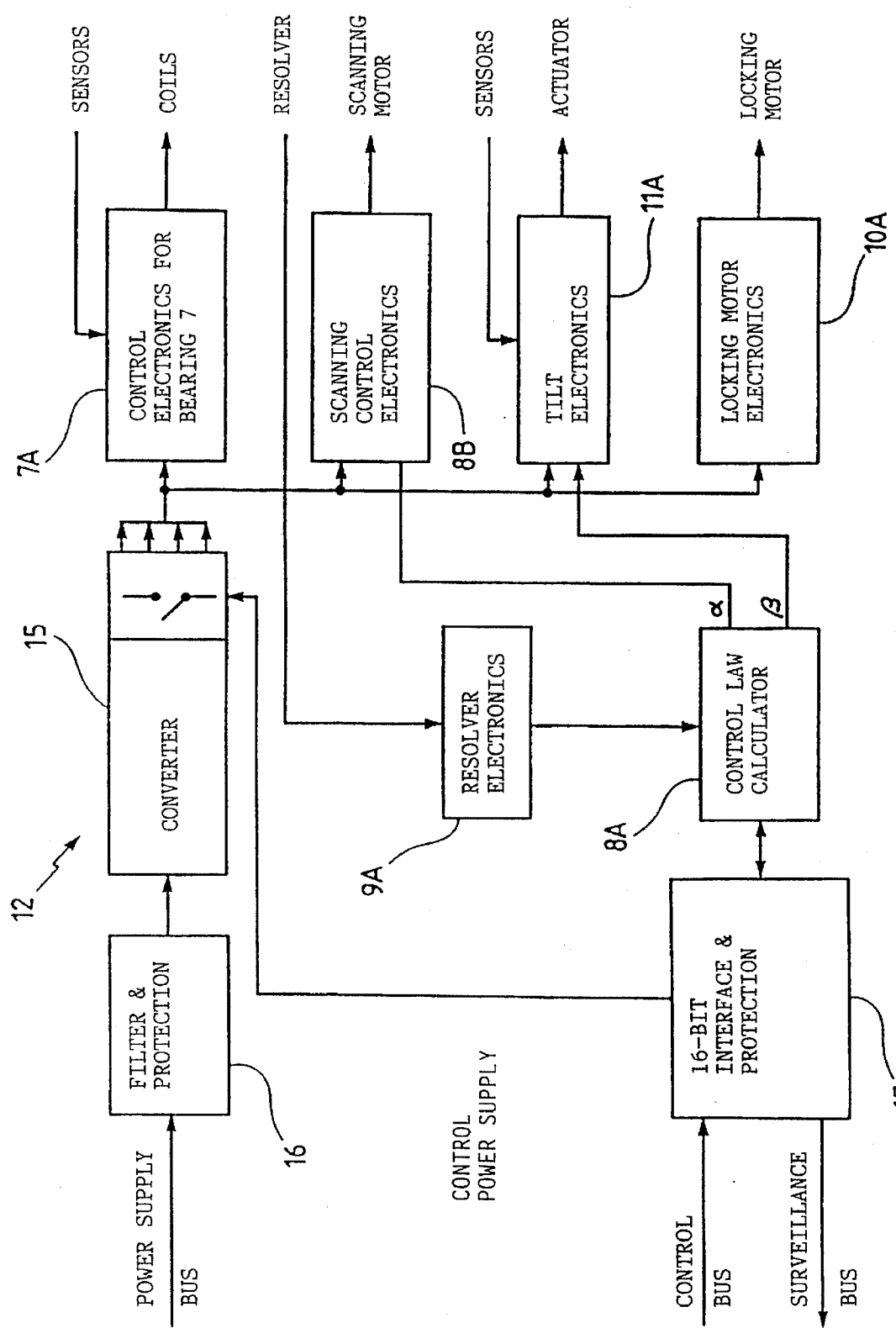
FIG. 12 is a block diagram of the control electronics of the device from FIG. 1.

The magnetic levitation stability of the rotor is assured by two identical control systems, each respective to one axis, shown conjointly under reference 7A in FIG. 12.

Each system has three functions:

an input signal processing stage;

a correction stage; and an amplification stage.

The only functions of the position sensors that are shared are generation of the 50 kHz carrier frequency.

The electronics receives as input a signal imaging the position of the rotor; this is processed by a corrector providing the transfer function required for stable control. A power amplifier provides the interface to the bearing.

Radial lifting of the rotor from an abutment position is effected automatically without requiring any additional function. The rotor can lift from the abutment position only when the control voltage is present.

Referring to FIGS. 4 to 6, the motor 8 controlling angular displacement of the rotor part 4 is a torque motor with its angular displacement limited to approximately 120° including a stator part or field assembly 30 including a pair of poles and a rotor part or armature 31 embodying a disk carrying one or more flat coils, each preferably implemented in printed circuit technology.

To be more precise, and referring to FIGS. 4 and 5, the field assembly 30 includes a pair of separate magnetic armatures 32 and 33 capping but not contacting the periphery of the armature over angular sectors subtending an angle of less 180° (for example 150°) and having axially projecting flanges or poles facing each other axially through the armature and defining with the latter radial air gaps. Each armature carries at least one portion of a respective ring permanent magnet 34 or 35 generating a magnetic flux closed axially through the armature; these portions of ring permanent magnets 34 and 35 advantageously run along the air gaps on either side of the armature 31 and are therefore magnetized axially.

In the example under consideration here the respective magnetic fluxes of the two armatures pass through the armature in respective different directions and the ring permanent magnet portions 34 and 35 have opposite axial magnetization directions.

For proper control of the magnetic flux through the armature the latter is advantageously interposed axially between two ring permanent magnet portions 34 and 34A or 35 and 35A for each armature.

The coil(s) formed on the armature 31 are formed by circular arc strands 36A concentric with the axis X—X and connected by radial sections or strands 36B divided into two sectors or groups S1 and S2 which are diametrically opposed and subtend an angle of about 30°, for example. The circular arc strands 36A and the radial sections 36B are joined to form a coil 36 having an input terminal E and an output terminal S.

FIG. 6 shows a coil 36 of this kind and in this drawing, for reasons of clarity, the distance between the adjoining radial sections 36B or the adjoining circular arc strands 36A are exaggerated, which has reduced their number. Note that the circular arc strands subtend an angle of almost 180° and that the radial strands of each of the two sectors S1 and S2 carry current in the same direction when current is applied between the terminals E and S. The circular arc strands define with the radial sections "banana-shape" turns nested one within the other to form at least one set of turns, in this example two sets of turns disposed on opposite sides of a diameter joining the sectors S1 and S2. One radial section (in this example the median section of sector S1) joins the two sets of turns (which therefore constitutes two half-coils).

The coil may be made up of wires but, as already mentioned above, the coil 36 can be formed by depositing tracks using printed circuit technology.

The armature can include a plurality of coils 36 formed by axially stacked printed circuit layers electrically insulated from each other (there can be more than one coil in the same layer), the input of each coil being connected to the output of the preceding coil, so that the coils are in series, and the groups S1 and S2 of the various coils being respectively stacked axially so that the torques generated by neighboring groups add rather than subtract.

The directions in which the current flows in the sectors are chosen so that, when each sector is sandwiched (without contact, in order to provide the aforementioned axial air gaps) in a respective armature, the permanent magnetization fluxes of the two armatures which close through the sectors induce torques in the same direction on the armature.

The circular arc strands are preferably radially offset from the flanges or pole portions to avoid generating radial torque as much as possible. Also, the armatures are preferably sufficiently deep to satisfy the aforementioned condition while protecting the radially outermost strands from possible leakage fields.

The current in the circular arc strands does not induce any torque on the armature.

This principle can be generalized to motors with one phase and n pairs of poles, provided that the required angular displacement is less than $2\pi/n$, in which case n pairs of diametrically opposed sectors are provided on the armature; there can be one or more coils per printed circuit layer, with banana-shape turns extending from a sector corresponding to one pair of poles to an adjacent sector extending to another pair of poles. As previously, the amplitude of the angular displacement is defined by the difference between the angle subtended by the armatures and by the sectors or groups of radial strands.

The angle subtended by the armatures is the angle subtended by their flanges and it is only preferable for the back of the armatures to subtend the same angle as the flanges: as an alternative to this, the radial back could subtend a smaller angle.

A configuration of this kind can therefore produce high torques with armatures having a low rotational inertia; it has the further advantage of generating a constant torque (without ripple) for a given current over all of its angular displacement, i.e. approximately 120° in this example (amplitude of each armature =150°- amplitude of each sector =30°), which could not be reliably achieved using a synchronous motor or a commutator motor with several pairs of poles. Another fundamental advantage of the motor 8 is the absence of divergent magnetic force (negative stiffness), enabling it to be used in conjunction with a magnetic bearing without further stability problems.

The motor is supplied with power through wires soldered directly to the input and output terminals of the armature, this being possible because of the limited angular displacement of the armature.

The main specifications of the motor are typically:
mean diameter of rotor/armature

| means diameter of rotor/armature coil: | 90 mm |
|---|---|
| max rotor diameter: | 120 mm |
| field in air gap: | 0.3 T to 0.4 T |
| number of printed circuit layers on rotor: | 4 to 6 |
| rotor thickness: | 1.6 mm |
| rotor inertia: | $1.3*10^{-5}$ kg.m$^2$ |
| maximum torque: | $6*10^{-2}$ N.m |
| current at maximum torque: | 2 A |

Two (known) angular position sensing technologies can achieve the required angular precision:

Optical resolver (not shown) embodying an engraved glass disk and several emitter (optical diode) and receiver (not shown) pairs offset by a quarter of the engraving pitch to indicate the direction of rotation and improve the accuracy of the resolver. A drawback of this type of resolver is the very small clearance required between the disk and the emitter/receiver pairs (a few tens of microns), which could prove to be incompatible with the flexibility of the associated magnetic bearing (or at least the axial clearance of the abutment). On the other hand, the electronics can be relatively simple. This type of decoder is a relative device (increment-decrement) and requires a marker for the zero position.

Figure 7:
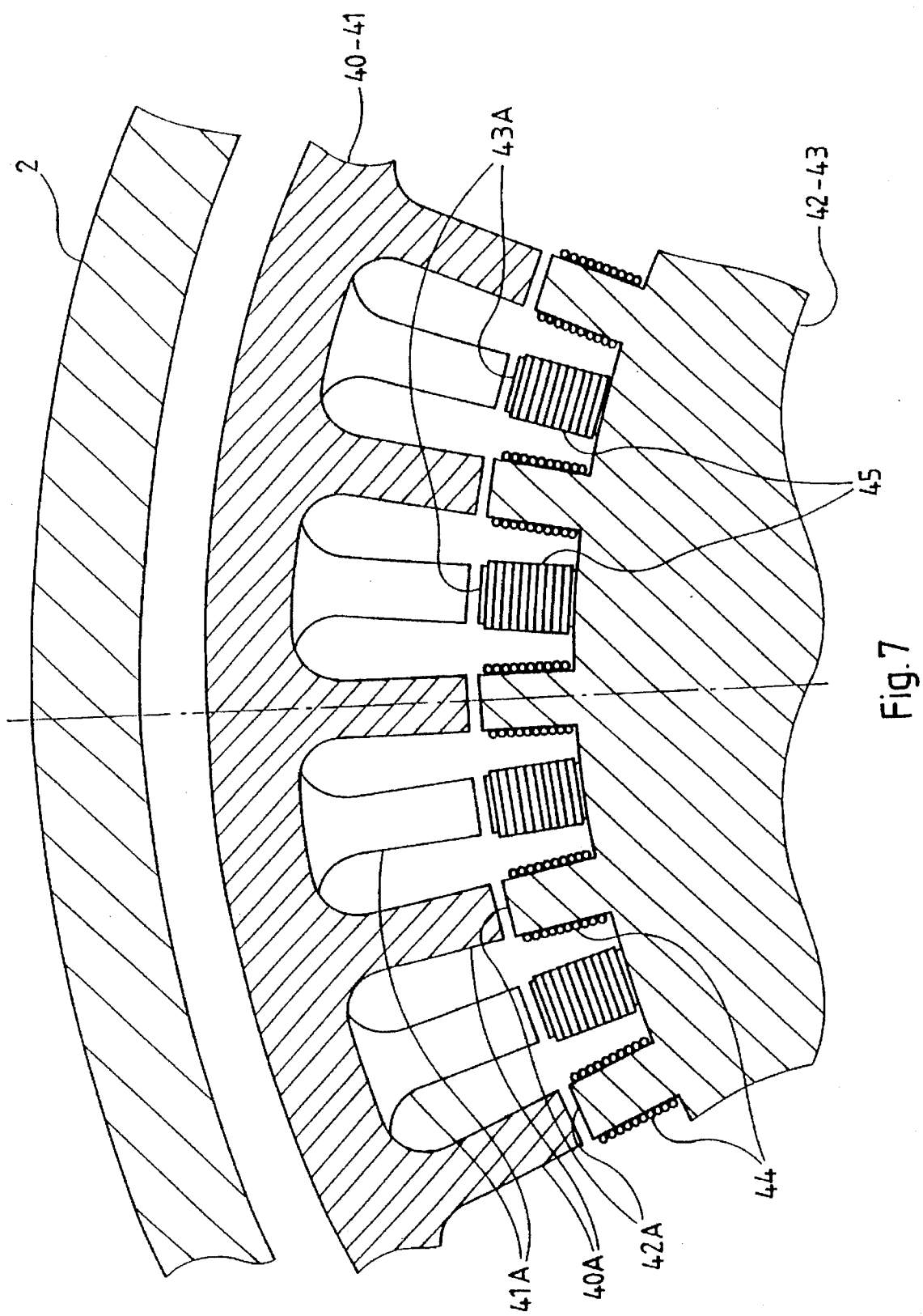
FIG. 7 is a partial axial view of the angular resolver from FIG. 1.

Variable reluctance magnetic resolver 9 (see FIG. 7) embodying a rotating part joined to the shaft (in this example by the rotor part of the bearing 7) and advantageously in the form of two toothed rings 40 and 41 offset axially and radially (by half the angular offset between teeth 40A and 41A of the rings—there are 32 teeth, for example, so that the radial offset is 5.625°—to indicate the direction of rotation) and a fixed part also having two toothed rings 42 and 43 but with teeth 42A and 43A surrounded by coils 44 and 45.

In this case, a sinusoidal AC voltage is fed into the coils of each ring of the fixed part (all the coils are in series) and the output current retraces the reluctance of the magnetic circuit thus formed: low reluctance for the facing teeth and high reluctance when the teeth in one ring are aligned with the gaps in the other ring. The shape of the teeth is adapted to produce a sinusoidal output signal for one pole pitch: appropriate processing electronics (synchrodigital resolver 9A in FIG. 12) then provides an accurate indication of the angular position over one pole pitch. This resolver is therefore a hybrid device: absolute for each pole pitch, but relative (incremental) from one pole pitch to another. With 32 teeth on each ring and the synchrodigital resolver 9A the required accuracy is achieved. The advantage of this principle is the possibility of using relatively wide air gaps (0.25 mm–0.3 mm) compatible with the flexibility of the magnetic bearing.

The input stages of the synchrodigital resolver 9A are analog stages and demodulate a pole pitch. The first stage of the electronics receives a measured voltage, imaging the sinusoidal variation of the inductance, which it converts by subtracting a voltage of the same frequency appropriately calibrated in terms of its phase and its amplitude.

The second stage is a synchrodigital converter to produce a binary word proportional to the instantaneous angular position.

The mirror 6 is positioned at the required set point value by a control unit 8A (FIG. 12) receiving as input the information from the angular resolver and the scanning set point. Its output is a control signal α.

The scanning motor is controlled (unit 8B in FIG. 12) by a current amplifier whose linearity and crossover distortion are compatible with the required performance. The amplifier receives as input the analog control signal α and outputs a current whose sign and amplitude are proportional to the torque required to control the scanning motor.

If possible, it is energized directly from the unregulated output voltage of a converter 15 connected to a power supply bus by a filter and protection device 16.

Figure 8:
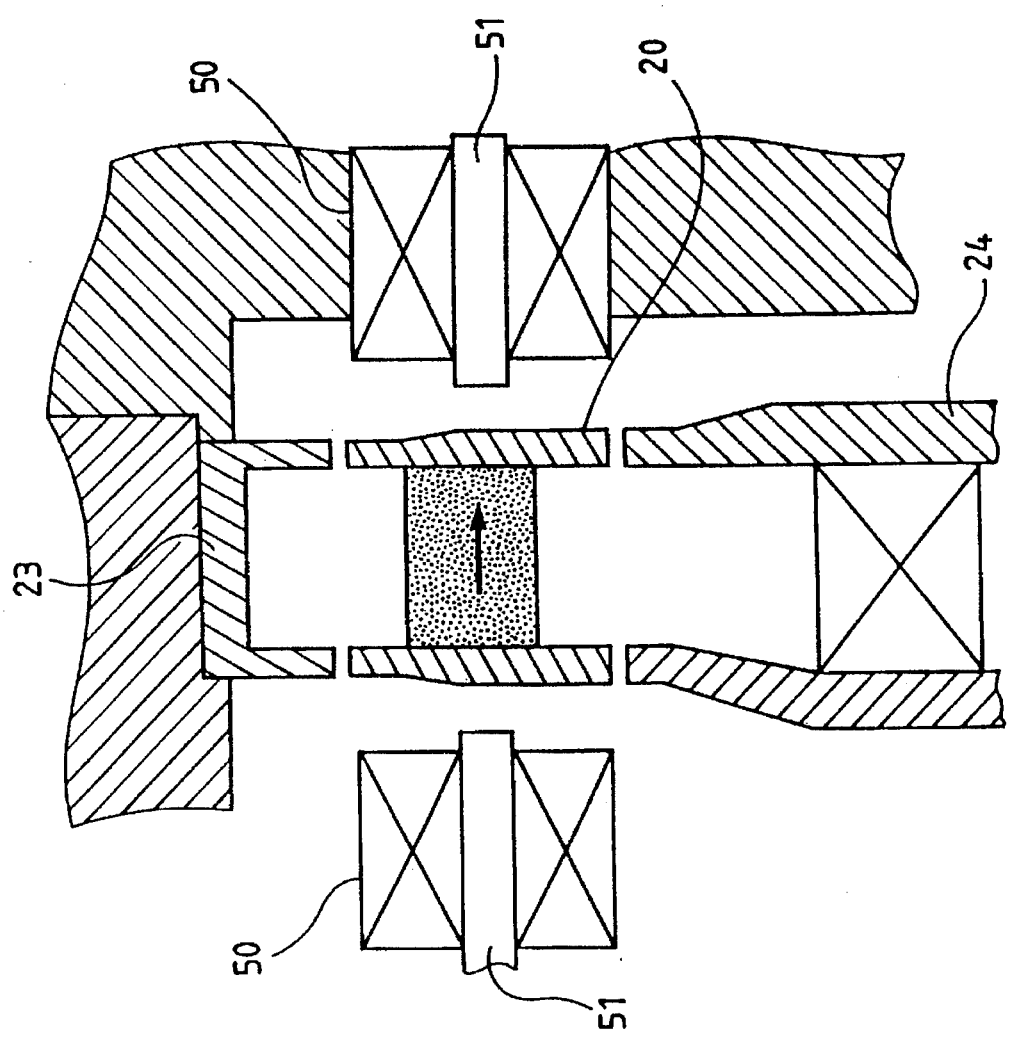
FIG. 8 is a complete view to a larger scale of the tilt control device from FIG. 1.

FIG. 8 shows the tilt control device 11 in more detail and more completely.

The device includes small coils 50 around cores 51 at least approximately axially facing the rotor part, for example facing the permanently axially magnetized ring 20. The coils are on respective axial sides of the rotor part, in areas diametrically opposed to the axis about which tilting is required (this axis is perpendicular to the plane of FIG. 1). Only the right-hand coils 50 are shown in FIG. 1, for reasons of clarity.

Tilting is commanded by activating two coils 50 on either side of both the rotor part and the axis of the latter so as to attract the rotor, in one area in one axial direction and in a diametrically opposite area in the opposite axial direction, which generates a transverse torque on the shaft. This exploits the fact that the magnetic bearing has a positive stiffness in tilting.

The torque is monitored by control electronics 11A (FIG. 12) receiving the tilt set point β and the response of the sensors which read the angle β. These sensors can be:

either dedicated sensors (two differential position sensors immediately adjacent the control coils, sensing the position of the rotor), or the two magnetic bearing position sensors 13 in the plane perpendicular to the tilt axis, plus two sensors identical to those of the magnetic bearing, mounted in the same plane but offset axially.

This solution has the advantage of using the same sensors for different functions.

Figure 9:
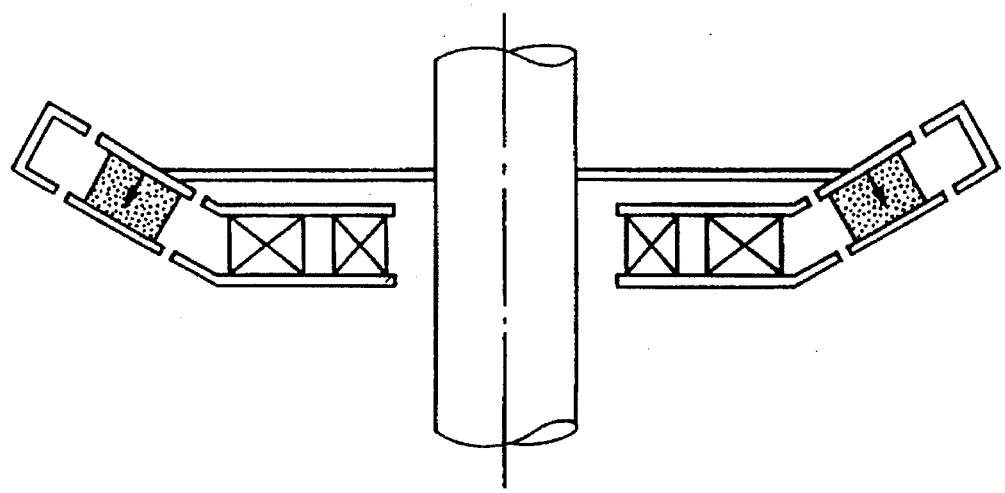
FIG. 9 is a view in axial section of a bearing and of a tilt control device in an alternative embodiment of the invention.

Another way to achieve tilting of the axis is to conform the pole pieces of the rotor and stator parts as a very flattened cone (the result is highly exaggerated in FIG. 9). Thus controlling the radial position of the suspended part corresponds to inclination of the bearing axis. This solution eliminates the combination of coils and sensors described above; however, it assumes that the magnetic bearing control electronics 11A are modified accordingly.

This solution has the advantage of a slight reduction in weight (by virtue of the elimination of two coils, two sensors and some of the electronics).

The aforementioned solutions are directed to tilting the rotor part about an axis substantially in the plane of the bearing.

Assuming that the rotor part is retained radially at any point on the shaft 5 (for example by another magnetic bearing preferably identical to the bearing 7), tilting can be achieved simply by modifying the set point for radial equilibrium of the bearing, without modifying the structure of the bearing.

Figure 10:
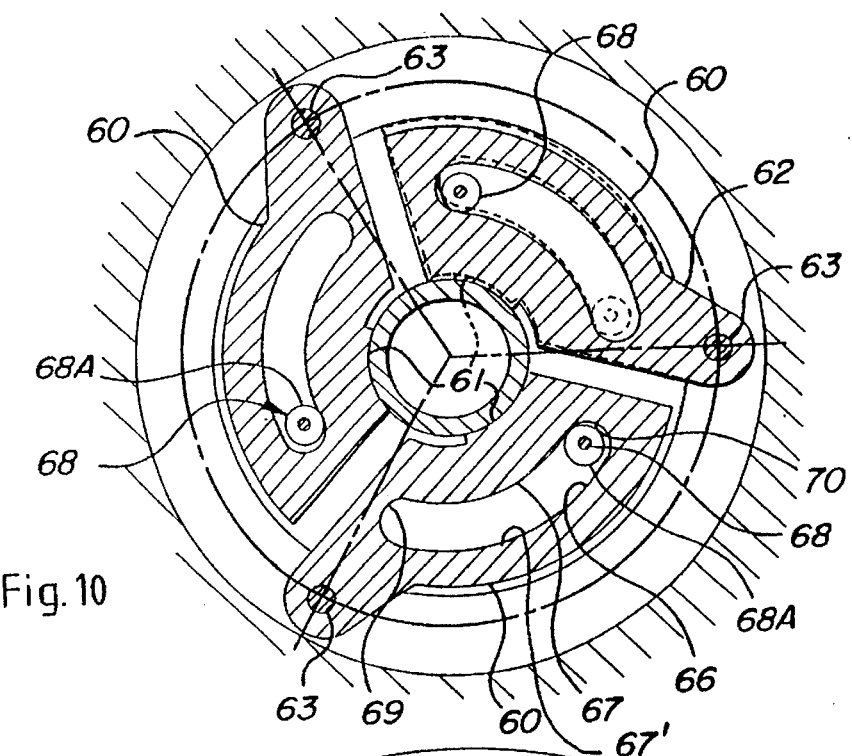
FIG. 10 is a partial transverse view of the locking device on the line X—X in FIG. 1.
Figure 11:
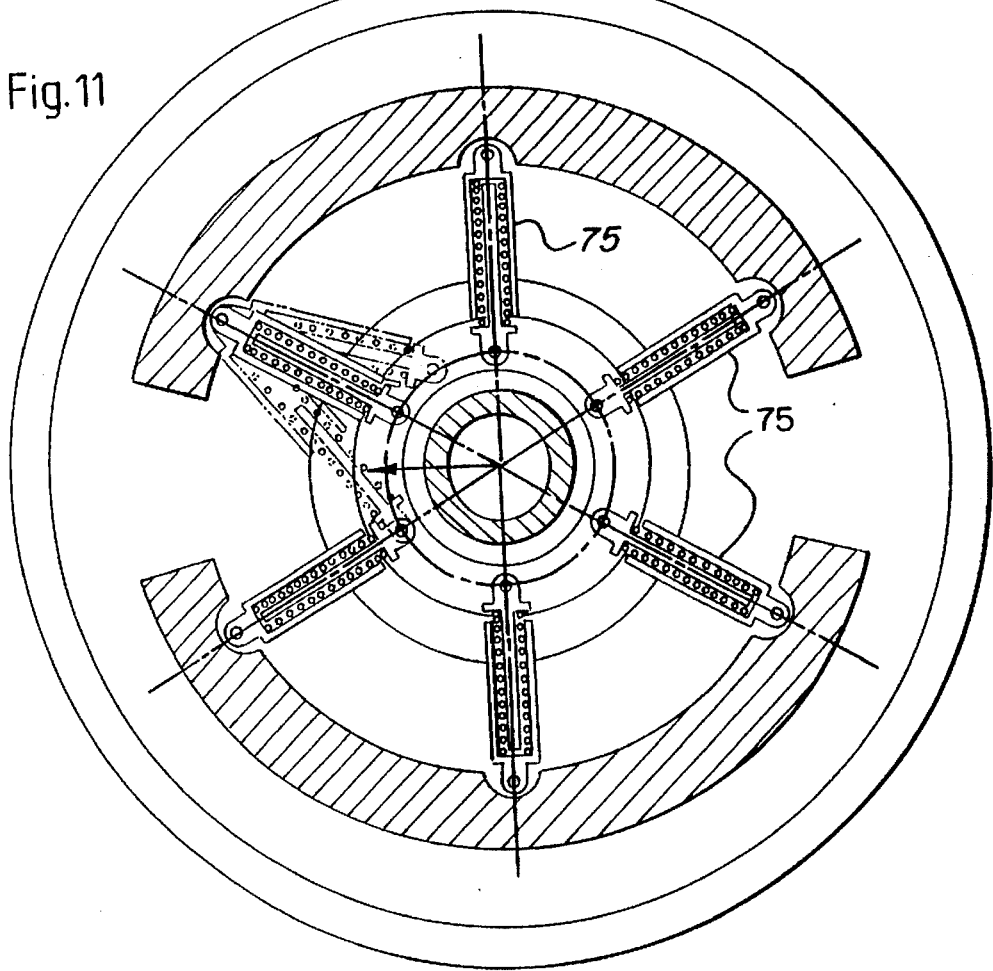
FIG. 11 is another partial view of the locking device on the line XI—XI in FIG. 1.

FIGS. 10 and 11 show the locking device 10.

The locking device 10 embodies three clamps 60 each having a clamp shoe 61 adapted, with the shoe 61 of the other clamps, to grip the shaft 5. As shown in FIG. 1, the shoes preferably enter a circumferential groove on the shaft whose flanks, which can be continuous or discontinuous, enable axial retention of the shaft in one direction at least (more generally, a few axial bearing surfaces for the edges of the shoes may suffice).

In areas 62 offset radially and circumferentially relative to the clamp shoes 61, the clamps 60 are articulated to the stator part of the device as a whole by means of axial pins 63.

The clamps 60 are accommodated in a transverse slot in a ring 65 (see also FIG. 1) adapted to rotate about the X—X axis with limited angular displacement, for example 60°.

Each clamp includes a slot 66 whose radially inner and outer edges 67 and 67', which are not concentric with the X—X axis, form ramps for an axial pin 68 fastened to the ring and passing through the slot. The pins 68 are preferably provided with bearings 68A to minimize friction on the ramps. Each slot 66 has a first circumferential end 69 near the axial pin 63 where the inner edge 67 is at a minimal distance from the axis of its shoe 61 and a second circumferential end 70 far from the axial pin 63 where the edge is at a maximal distance from the shoe axis.

The three axial pins 68 are positioned in the ring 65 through its slot so as to be simultaneously either at the first circumferential ends 69 (unlocked configuration) or at the second circumferential ends 70 (locked configuration).

The ring 65 is rotationally spring-loaded towards one or other of the locked and unlocked configurations by a passive bi-stable system using elastic members 75 (based on springs—see below). This guarantees that the unlocked configuration is maintained and not only that the locked configuration is maintained but also application of force to the shaft by the shoes: in practice the slots 66 have dimensions such that the clamping shoes are applied to the shaft before the pins abut circumferentially against the second circumferential ends 70.

The ring 65 is maneuvered between its two configurations against the previously mentioned passive bi-stable return means by a motor 71A which is advantageously of the same type as the motor 8; this motor 71A includes in this example the same armatures as the motor 8 (see FIG. 1), with partially annular fixed magnetic parts 72 disposed between the armatures of the two motors and between the magnetized ring portions of the armature from FIG. 5 (the parts 72 subtend the same angle as the ring portions). The annular part 72 is fixed to the stator part by any appropriate known nonmagnetic means to prevent the occurrence of magnetic leakage.

Although the usable angular displacement of the motor 71A is smaller than that of the motor 8, its armature can have the same geometry as in FIG. 6, for reasons of simplicity.

The motor is controlled by electronics 10A (FIG. 12).

The configuration of the motor 71A, like that of the motor 8, procures a small axial overall dimension (especially if common armatures are used) and a high torque.

The ring 65 to which the armature of the motor 71A is fixed is preferably joined to the annular magnetic part 72 (or any stator part) by a plurality of (for example four or six) the generally radial elastic members 75 operating in compression. In this example they are articulated and mobile transversely to the axis between two extreme configurations in which the clamps are either in the locked or unlocked configuration; these elastic members have an intermediate configuration (of unstable equilibrium) in which they are radially oriented, with the result that the locking device is a passive bi-stable device. The spring members have a two-fold function (see below) in that they generate the clamping force and provide the bi-stable positioning.

The spring members thus assure: secure locking (no unlocking due to vibration), secure unlocking, and a reversible locking/unlocking function.

This solution avoids the use of pyrotechnic release means and enables a plurality of locking and unlocking cycles of the complete system during ground tests so that the locking system itself can be tested. The system is therefore designed to be operated a plurality of times on the ground and once only in flight to effect the unlocking.

With regard to the power supply (see FIG. 12), the only power supply required is the primary voltage of the power supply bus. The power supply electronics (unit 16 already mentioned) has at its input the protection arrangements required to preserve the integrity of the power supply and the necessary filters.

Thereafter one or more converters 15 provide the voltages required by the electronics of the scanning system and galvanic isolation.

The system is interfaced to and protected from the onboard computer (and vice versa) by an interface and protection unit 17 (FIG. 12) to which it is connected by a control bus and a surveillance bus.

A dynamic compensation system can be provided, if necessary, to eliminate or at least strongly reduce the reaction torque transmitted to the satellite. The theory of this system would be based on the rotation of an inertia wheel in the opposite direction to the mirror. Various solutions are feasible, but the only one which would seem reliable (although representing a penalty from the mass point of view) without degrading the angular accuracy of scanning is to install on the axis of the main system another magnetic bearing rotated by a motor identical to that of the scanning system and coupled to a flywheel. No mechanical linkage (gearing) links the main system to this new bearing-motor-flywheel system; both motors (scanning and dynamic compensation) are simply connected together (in series so as to obtain the same torque) in opposition: the scanning control system therefore activates at the same as the system carrying the mirror and the flywheel. The resulting torque transmitted to the satellite is therefore the difference between the torques of the two motors, i.e. the difference between the fields of the magnets of the stators of each of the two motors.

Figure 13:
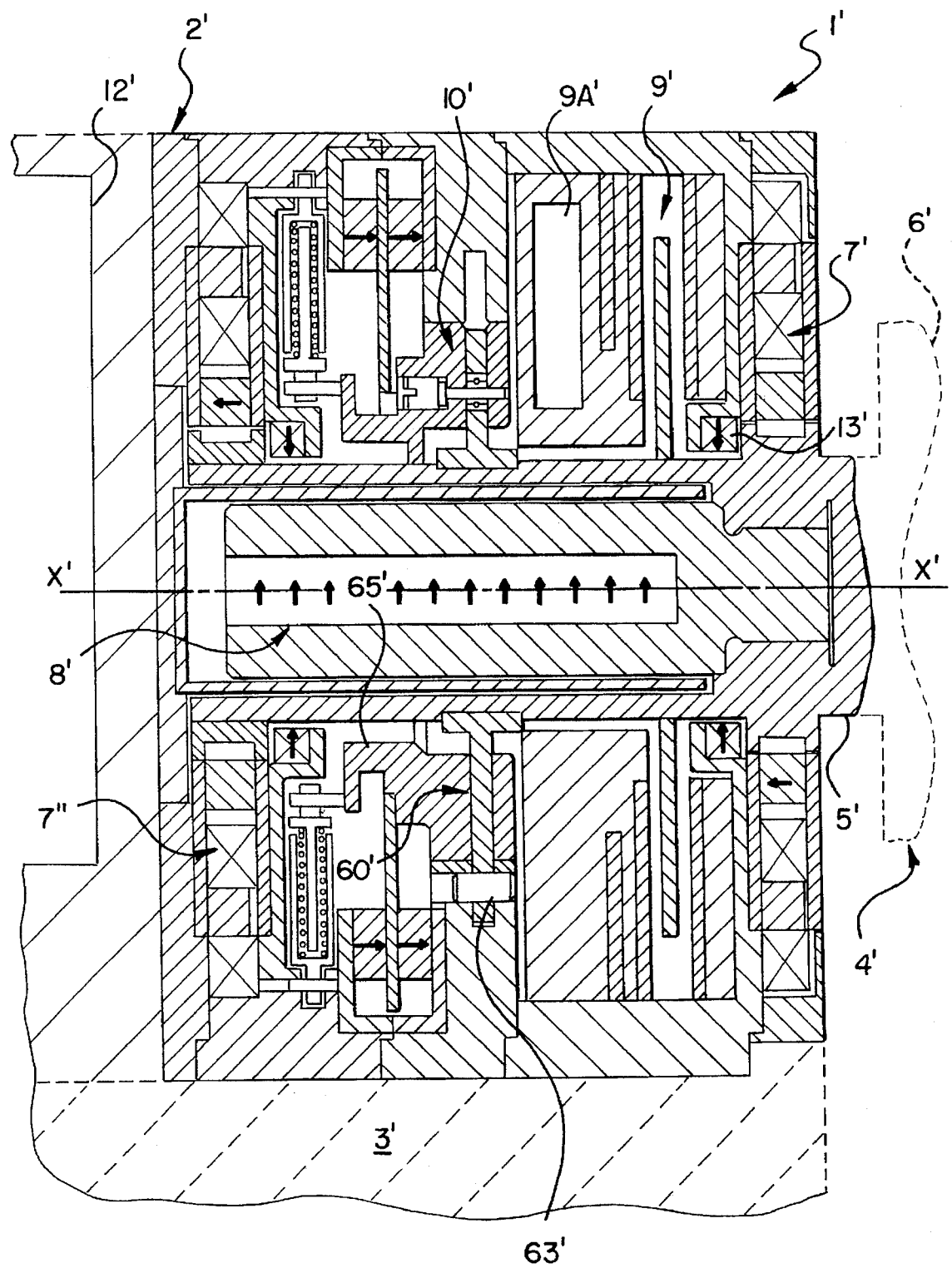
FIG. 13 is a variant of FIG. 1 showing in diagrammatic axial section another angular displacement control device.

FIG. 13 shows an angular displacement control device 1' including, like that of FIG. 1, a stator part 2' intended to be fixed to a support 3', for example a satellite in terrestrial orbit, and a rotor part 4' rotatable relative to the stator part 2' about an axis X'—X', for example an axis parallel to the aforementioned orbit, including a shaft 5' and a payload 6' such as a scanning mirror.

The device 1' essentially embodies bearings 7' and 7", a motor 8', an optional angular resolver 9', a locking device 10' (advantageously disposed axially between the bearings, which improves the retention of the shaft), a tilt control device and an electronic unit 12' controlling the operation of the various components of the device 1'. Radial position sensors 13' are provided for the bearings 7' and 7".

The bearings 7' and 7" are active magnetic bearings, as previously. In this example they are identical. They are of a conventional type known from French Patent 87-03489 or U.S. Pat. No. 4,918,345 (VAILLANT DE GUELIS et al.) with two transverse control axes.

Each bearing includes, on the rotor part side, a simple ferromagnetic pole ring with annular ribs and, on the stator side, a ring of axially magnetized permanent magnets axially sandwiched between two flat annular pole parts defining air gaps with the ribs and between which are two pairs (of which only one can be seen) of diametrically opposed axial cores, the pairs being offset 90° and carrying coils. Radial slots (not shown) are advantageously provided in the pole pieces, alternating circumferentially with the core/coil assemblies and intended to prevent magnetic leakage from one coil to the other (in the known manner). Each radial control axis (of which there are two in this example) is associated with two diametrically opposed coils electrically connected together to form a circuit independent of that of the other axis.

This bearing provides a very low rotational inertia as most of the component parts of the bearings are carried by their stator part.

One example of the dimensions of the bearing 7' and 7" is as follows:

| | |
|---|---|
| - mean diameter of bearing rotor: | 47 mm |
| - air gaps: | 0.60 nim |
| - rotation inertia of both rotors: | $7.1 \times 10^{-6}$ kg.m$^2$ |
| - mass of magnets: | 70 g |
| - stiffness (per bearing): axial: | 20 N/mm |
| radial: | 100 N/mm |
| - abutment radial clearance (at radius): | 0.20 mm |
| - actuator: | |
| . number of turns: | 170 |
| . wire diameter: | 0.6 mm |
| . lift current under 1 g for 0.2 mm of initial offset (worst case, ground tests): | 2 A |
| . minimum lift voltage: | 5 V |

Control is based on information supplied by the radial position sensors 13' of the rotor (two sensors per control axis). The magnetic bearings 7' and 7" can use speed sensors or displacement sensors and it will be apparent to one skilled in the art how to adapt the electronic unit accordingly.

Figure 15:
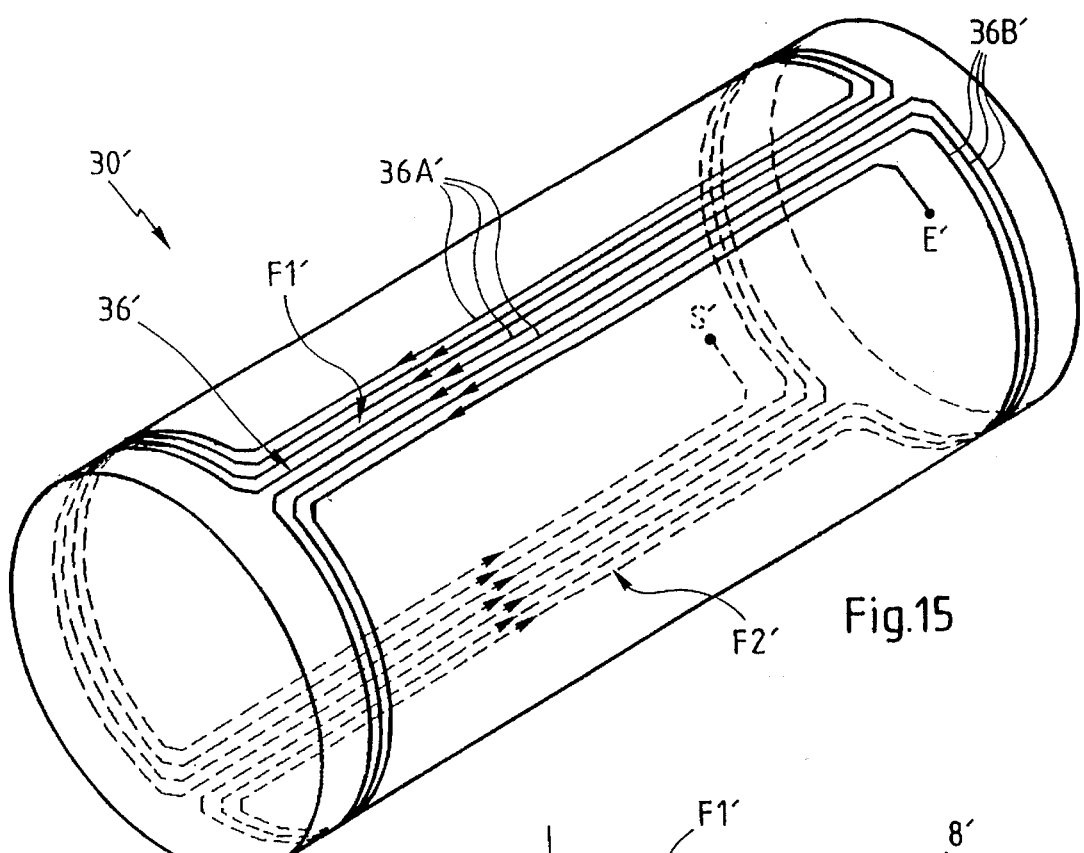
FIG. 15 is a perspective view of the stator part (field assembly) of the motor from FIG. 13.
Figure 14:
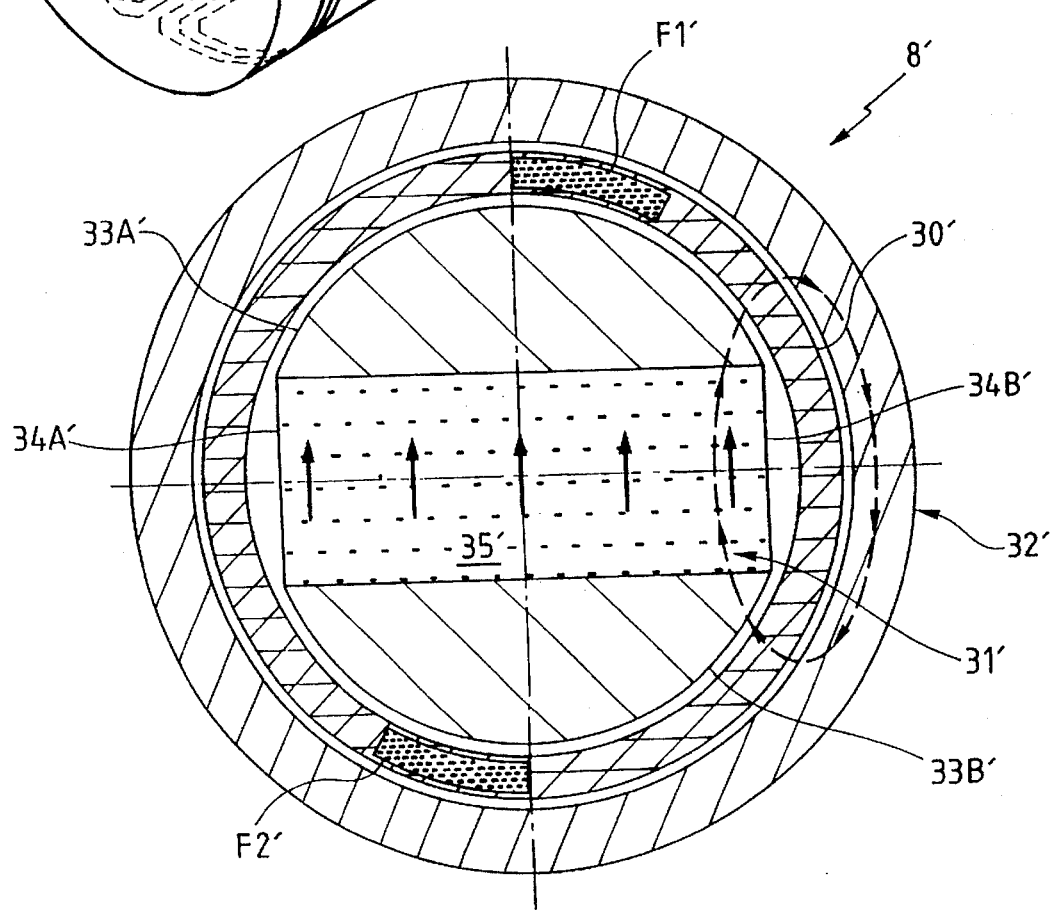
FIG. 14 is a view of the motor from FIG. 13 in transverse section.

Referring to FIGS. 14 and 15, the motor 8' controlling angular displacement of the rotor part 4' is a torque motor with its angular displacement limited to approximately 120°. It is located entirely within the overall radial dimension of the shaft 5'.

To be more precise, the torque motor 8' includes, on the stator side, a tubular armature 30' and, on the rotor side, a field assembly in the form of a central bar 31' extending axially inside the tubular armature and a ferromagnetic tubular portion 32' extending all around the tubular armature 30'.

FIG. 13 shows that the ferromagnetic flanges of the magnetic bearings 7' and 7" are also on the ferromagnetic tubular portion 32'.

An annular air gap whose radial dimension is normally constant exists between the tubular armature 30' and the tubular rotor portion 32'; the external surface of the armature and the internal surface of the tubular portion are cylindrical.

However, the external surface of the central bar 31' is in the form of two portions 33A' and 33B' of a common cylinder subtending substantially equal angles less than 180° (for example 150°); they are diametrically opposed and separated by two longitudinal flats 34A' and 34B' (which are plane and parallel in this example) so that the two cylindrical portions 33A' and 33B' define with the armature two air gaps whose radial dimension is very much less than the average radial distance between the flats and the field assembly. As an alternative (not shown) the flats are convex or preferably concave.

A permanent bar magnet 35' is disposed on the central bar 31' with its direction of magnetization transverse to the axis and parallel to the flats so as to generate a magnetic flux from one cylindrical portion to the other. This flux leaves one cylindrical portion and travels radially through the armature as far as the tubular ferromagnetic portion in which it flows circumferentially until it re-enters the central bar via the other cylindrical portion. One flux line is shown by way of example.

The permanent bar magnet advantageously extends the full width of the central bar between the flats so that the central bar forms a bar magnet separating two pole pieces.

As shown in FIG. 15, the armature includes at least one coil 36'.

Each coil 36' includes separate parallel longitudinal strands 36A' (the distance between these is exaggerated in FIG. 15 for reasons of clarity), connected by strands 36B' disposed transversely to the axis, in this example in circular arcs so that the strands are all in series between an input terminal E' and an output terminal S'. The longitudinal strands are divided into the diametrically opposed groups F1' and F2' which subtend angles less than those of the cylindrical portions of the central bar, for example an angle in the order of 20° in this example. All the strands of the same group carry current in the same direction if current is applied between terminals E' and S'.

The groups are disposed on the armature so that they face the cylindrical portions of the central bar. Accordingly, as soon as current is applied in one direction or the other between the terminals E' and S', the interaction of the current flowing in the longitudinal strands with the magnetic flux flowing through the armature generates a torque on the bar. The maximum angular displacement of the field assembly is therefore substantially equal to the difference between the angle subtended by the groups of the armature and the angles subtended by the cylindrical portions of the central bar.

The currents flowing in the transverse strands do not generate any torque, of course.

The transverse strands are preferably offset axially from the central bar permanent magnet. In other words, the central bar is advantageously shorter than the longitudinal strands to prevent the occurrence of coaxial forces.

Although permanently magnetized materials usually have a high density, in the invention this has little impact on the rotational inertia of the mobile assembly given that the bar magnet is on the rotation axis.

The coil 36' can be made by depositing tracks using printed circuit technology, in which case the armature can include a plurality of coils 36' formed by radially stacked printed circuit layers electrically insulated from each other, the input of each coil being connected to the output of the preceding coil so that all the coils are in series. The like groups of the various coils are stacked radially so that the torques generated by adjoining groups add rather than subtract.

However, referring to FIG. 15, the coils can be formed of wires such that the strands of the groups are conductive wires distributed over the thickness of the tubular armature.

As in the case of FIG. 1, a configuration of this kind can therefore produce high torques with armatures having a low rotational inertia; it has the further advantage of generating a constant torque (without ripple) for a given current over all of its angular displacement, i.e. approximately 130° in this example, which could not be reliably achieved using a synchronous motor or a commutator motor with several pairs of poles. Another fundamental advantage of the motor 8' is the absence of divergent magnetic force (negative stiffness), enabling it to be used in conjunction with a magnetic bearing without further stability problems.

The main specifications of this motor are typically:

| | |
|---|---|
| mean diameter of stator coil (armature): | 28.5 min |
| stator tube thickness: | 2.2 mm |
| field in air gap: | 0.3 T |
| coil resistance: | 2.3 ohms |
| rotor inertia (magnet + center tube): | $6.46*10^{-6}$ kg.m$^2$ |
| maximum torque: | $6*10^{-2}$ N.m |
| current at maximum torque: | 2 A |
| power dissipated at Imax: | 9 W |

In this example the angular resolver 9' is an optical resolver embodying an engraved glass disk and several pairs of emitters (optical diode) offset by a quarter of the engraving pitch to indicate the direction of rotation and improve the accuracy of the resolver.

It is preferable to exploit the presence of two magnetic bearings to obtain tilting simply by displacing the set point position of at least one bearing or the set point positions of the shaft in opposite radial directions for the two bearings, which induces a torque.

For example, the bearings 7' and 7" are disposed so their transverse control axes are parallel and the coils of the bearings operating parallel to a common direction are energized. Tilting is in fact obtained if the set point for a single pair of coils in a single bearing is displaced.

This tilting is controlled by the control electronics according to the tilt set point β.

The locking device 10' is identical to the device 10 shown in FIGS. 10 and 11.

The foregoing description is obviously given by way of non-limiting example and numerous variants can be put forward by one skilled in the art without departing from the scope of the invention. For example, the resolver can be dispensed with, for example if the rotor of the motor is spring-loaded towards a given neutral configuration relative to the stator.

What is claimed is:

1. A device for positioning a body having a shaft and rotating about an axis relative to a stator body, said device having a locking/unlocking device comprising:

a plurality of clamps;

clamping shoes disposed on said plurality of clamps and adapted to bear radially on said shaft of said body;

means disposed at a first predetermined distance from said axis for enabling articulation of said plurality of clamps relative to said body, said means enabling articulation being equi-angularly distributed around said axis;

means for pivoting said plurality of clamps about said enabling means between an unlocked configuration in which said clamping shoes are at a first predetermined maximum distance from said axis and a locked configuration in which said clamping shoes are at a first predetermined minimal distance from said axis such that said shaft is clamped radially;

each of said plurality of clamps having a circumferentially disposed slot having a first end located radially at a second predetermined minimal distance from said axis and a second opposite end located radially at a second predetermined maximum distance from said axis; and said pivoting means further comprising:

an annular ring concentric with said axis of said body and being capable of an angular displacement; and a plurality of pins extending from said annular ring and engaging said circumferentially disposed slots, said plurality of pins being at said first ends of said circumferentially, disposed slots when said plurality of clamps are in said unlocked configuration and said plurality of pins being at said second opposite ends of said slots when said plurality of clamps are in said locked configuration.

2. The device according to claim 1 wherein each of said plurality of pins comprises a bearing for engaging a corresponding one of said circumferentially disposed slots.

3. The device according to claim 1 wherein said pivoting means further comprises means radially attached to said annular ring for urging said clamping shoes radially towards said axis of said body.

4. The device according to claim 1 wherein said pivoting means further comprises a plurality of plurality of radial spring members attached to said stator body, said radial spring members operating in compression and mobile in a plane transverse to said axis so as to be operable about an unstable configuration such that said plurality of radial-spring members are radially oriented at one of two stable extreme positions while said plurality of clamps are in one of said locked and unlocked configurations.

5. The device according to claim 1 wherein said pivoting means further comprises a torque motor having a first armature fastened to said annular ring and a field assembly joined to said stator body.

6. The device according to claim 5 wherein said first armature comprises a flat disk and said field assembly comprises at least one pair of circumferentially separated second armatures capping without contacting a radially external periphery of said flat disk, each of said at least one pair of circumferentially separated second armatures having two flanges forming opposing axial projections, each of said at least one pair of circumferentially separated second armatures having a permanently magnetized ring coplanar with said axis, at least a portion of said permanently magnetized ring being formed in each of said at least one pair of circumferentially separated second armatures to generate a magnetic flux closed axially between said two flanges through said first armature;

wherein said first armature further comprises at least one plane coil having concentric circular arc strands and radial strands that form an input and an output, said concentric Circular arc strands being concentric with said axis and said radial strands connecting said concentric circular arc strands so as to form at least one set of arcuate turns nested in each other but connected in series, said radial strands of each said at least one plane coil being grouped into at least one pair of groups formed of adjacent radial strands that are separated so that when current is applied between said input and said output of said at least one plane coil, all of said radial strands of each of said at least one pair of groups carry current in a same radial direction, each of said at least one pair of groups being disposed axially between said two flanges of a corresponding one of said at least one pair of circumferentially separated second armatures; and wherein said magnetic flux flowing through said first armature between said two flanges is in a direction such that when current is supplied between said input and said output of said at least one plane coil an interaction between said radial current flowing in said radial strands of said at least one pair of groups and said magnetic flux generates on said first armature a torque in one direction, an angular amplitude of said angular displacement of said annular ring being defined by a difference between an angle subtended by said two flanges and an angle subtended by said at least one pair of groups of said radial strands.

7. The device according to claim 6 wherein said permanently magnetized ring of each of said at least one pair of circumferentially separated second armatures comprises one flange of said two flanges, said permanently magnetized ring being permanently magnetized in an axial direction.

8. The device according to claim 7 wherein each of said two flanges of each said of said at least one pair of circumferentially separated second armatures comprises a ring portion permanently magnetized in said axial direction.

9. The device according to claim 6 wherein said torque motor further comprises a single diametrically opposed pair of said at least one pair of circumferentially separated second armatures and a single diametrically opposed pair of said at least one pair of groups per each of said at least one plane coil.

10. The device according to claim 9 wherein each of said at least one pair of circumferentially separated second armatures is subtended by an angle between about 90° and about 170°.

11. The device according to claim 9 wherein each of said at least one pair of groups is subtended by an angle of less than approximately 30°.

12. The device according to claim 6 wherein said at least one plane coil comprises a plurality of coils connected in series and forming axially stacked layers electrically insulated from each other, said input of each of said plurality of coils being connected to said output of a preceding coil of said plurality of coils, and wherein said at least one pair of groups formed of adjacent radial strands are axially stacked.

13. The device according to claim 12 wherein said first armature is formed of two to ten layers of coils.

14. The device according to claim 6 wherein said at least one plane coil comprises printed circuit tracks.

15. The device according to claim 1 wherein said body is rotated within an angular displacement of less than about 180° by an angular displacement drive motor comprising:

a field assembly; and a disk-shaped armature rotating relative to said field assembly;

wherein said field assembly comprises:

at least one pair of circumferentially separated magnetic armatures capping without contacting a radially external periphery of said disk-shaped armature, each of said at least one pair of circumferentially separated magnetic armatures having two flanges forming axial projections facing each other through said disk-shaped armature; and a permanently magnetized ring having at least a portion that is coplanar with said axis so as to generate a magnetic flux closing axially between said two flanges through said disk-shaped armature;

wherein said disk-shaped armature comprises at least one plane coil having two concentric circular arc strands and radial strands that form an input and an output, said concentric circular arc strands being concentric with said axis and said radial strands connecting said concentric circular arc strands so as to form at least one pair of assemblies of arcuate turns nested in each other but connected in series, said radial strands of each said at least one plane coil being grouped into at least one pair of groups of adjacent radial strands that are separated so that when current is applied between said input and said output of said at least one plane coil all of said radial strands in each of said at least one pair of groups carry current in a same radial direction, each of said at least one pair of groups being disposed axially between said two flanges of a corresponding one of said at least one pair of circumferentially separated armatures; and wherein said magnetic flux flowing through said disk-shaped armature between said two flanges is in a direction such that when current is applied between said input and said output of said at least one plane coil an interaction between said current flowing in said radial strands of said at least one pair of groups and said magnetic flux generates on said disk-shaped armature a torque in one direction, an amplitude of said angular displacement of said body being defined by a difference between an angle subtended by said two flanges and an angle subtended by said at least one pair of groups of said radial strands.

16. The device according to claim 15 wherein said pivoting means comprises:

an annular ring concentric with said axis of said body and being capable of an angular displacement; and a torque motor having an armature fastened to said annular ring and a field assembly joined to said stator body;

wherein said angular displacement drive motor rotating said body and said torque motor have common armatures, said common armatures having flanges and fixed magnetic partially annular parts between said armature of said torque motor and said disk-shaped armature of said angular displacement drive motor and between said flanges of said common armatures, said fixed magnetic partially annular parts being magnetically isolated from said stator body.

17. The device according to claim 1 further comprising an angular displacement drive motor adapted to rotate said body within an angular displacement of less than about 180° about said axis, said angular displacement drive motor comprising:

a field assembly connected to said shaft and having a central bar elongate along said axis and a ferromagnetic tubular portion extending circumferentially all around said central bar at a radial distance therefrom, said central bar including two diametrically-opposed semi-cylindrical portions concentric with said axis, said semi-cylindrical portions subtending a substantially equal angle of less than about 180° and being separated by two longitudinal flats that are substantially parallel and a permanently magnetized central bar on said axis and having a magnetization direction that is substantially parallel to said longitudinal flats;

a tubular armature interposed radially between said central bar and said ferromagnetic tubular portion, said tubular armature including at least one coil having an input and an output and including separate parallel longitudinal strands connected by circumferential strands disposed transversely to said axis, said longitudinal strands being divided into two diametrically-opposed groups, said longitudinal strands of each of said two diametrically-opposed groups carrying current in one direction when current is applied between said input and said output of said at least one coil, each of said two diametrically-opposed groups facing a respective one of said semi-cylindrical portions and said angular displacement being less than a difference between said angles subtended by said semi-cylindrical portions and by said two diametrically-opposed groups.

18. The device according to claim 17 wherein said clamping shoes are applied to said ferromagnetic tubular portion of said field assembly.

19. The device according to claim 1 wherein said locking/unlocking device is disposed axially between two magnetic bearings each having two transverse control axes.

20. The device according to claim 19 wherein each of said two magnetic bearings comprises:

a ferromagnetic pole ring carried by said shaft and permanently magnetized in an axial direction;

an exterior ring disposed around said ferromagnetic pole ring and being carried by said stator body;

two pairs of axial cores circumscribed by said ferromagnetic pole ring and carrying coils; and two pole plates gripping said two pairs of axial cores.

21. The device according to claim 20 wherein said two magnetic bearings comprise:

two annular polepieces;

an annular ring permanently magnetized in an axial direction, said annular ring being gripped between said two annular polepieces and linked to said shaft;

pole plates disposed on one radial side of said annular ring;

two pairs of axial cores axially gripped between said pole plates;

coils disposed around each core of said two pairs of axial cores; and a ring circumscribing said annular ring so as to close a magnetic flux generated by said annular ring.

22. The device according to claim 21 wherein said two magnetic bearings further comprise a tilt control device including a plurality of coils adapted to apply to said shaft a torque transverse to said axis.

23. The device according to claim 22 further comprising:

a rotor member linked to said shaft;

cores disposed at least approximately axially facing said rotor member, said cores being disposed on opposite sides of said rotor member and said axis, each coil of said plurality of coils being disposed around a corresponding one of said cores.

24. The device according to claim 21 further comprising a tilt control device that includes one of said two pairs of coils of said two magnetic bearings and a control unit adapted to offset the radial set point position of said shaft transversely to said axis.

25. The device according to claim 1 wherein said shaft includes axial thrust bearings axially facing said clamping shoes in said locked configuration so as to axially hold said shaft in said locked configuration.

* * * * *

UNITED STATES PATENT AND TRADEMARK OFFICE
CERTIFICATE OF CORRECTION

PATENT NO. : 5,625,240
DATED : April 29, 1997
INVENTOR(S) : Bernus

It is certified that error appears in the above-identified patent and that said Letters Patent is hereby corrected as shown below:

Column 10, line 13, kindly delete "mean diameter of rotor/armature".

Column 10, line 15, kindly delete "means" and insert --mean--.

Column 13, line 50, after "same" kindly insert ---- time ----.

Column 14, line 31, kindly delete "nim" and insert ---- mm ----.

Column 14, line 35, kindly indent "radial".

Column 16, line 18, kindly delete "min" and insert ---- mm ----.

Column 17, line 17, after "circumferentially" kindly delete the comma ",".

Column 17, line 30, kindly delete "plurality of", second occurrence.

UNITED STATES PATENT AND TRADEMARK OFFICE
CERTIFICATE OF CORRECTION

PATENT NO. : 5,625,240
DATED : April 29, 1997
INVENTOR(S) : Bernus

It is certified that error appears in the above-identified patent and that said Letters Patent is hereby corrected as shown below:

Column 17, line 31, before "radial" kindly insert ---- plurality of ----.

Column 17, line 34, kindly delete "radial-" and insert ---- radial ----.

Column 17, line 58, kindly delete "Circular" and insert ---- circular ----.

Column 18, line 24, kindly delete "said of".

Column 20, line 31, kindly delete "20 and insert ---- 19 ----.

Signed and Sealed this

Twenty-ninth Day of December, 1998

Attest:

BRUCE LEHMAN

Attesting Officer

Commissioner of Patents and Trademarks